(12) United States Patent
Baum et al.

(10) Patent No.: US 6,891,127 B2
(45) Date of Patent: May 10, 2005

(54) IMPLEMENTATION SYSTEM FOR CONTINUOUS WELDING, METHOD, AND PRODUCTS FOR IMPLEMENTATION OF THE SYSTEM AND/OR METHOD

(75) Inventors: Gary Lee Baum, Diamondale, MI (US); Anthony John Zaccagni, Grosse Pointe, MI (US)

(73) Assignee: Weld Aid Products, Inc., Detroit, MI (US)

( * ) Notice: Subject to any disclaimer, the term of this patent is extended or adjusted under 35 U.S.C. 154(b) by 126 days.

(21) Appl. No.: 10/374,458

(22) Filed: Feb. 26, 2003

(65) Prior Publication Data

US 2004/0016734 A1 Jan. 29, 2004

Related U.S. Application Data

(63) Continuation-in-part of application No. 10/012,591, filed on Nov. 10, 2001, which is a continuation of application No. 09/499,199, filed on Feb. 7, 2000, now Pat. No. 6,369,357.

(51) Int. Cl.⁷ .............................. B23K 9/28; B23K 9/00
(52) U.S. Cl. .............................. 219/137.43; 219/136 R; 219/137.2
(58) Field of Search .............................. 219/136, 137.2, 219/137.43, 137 R (56) References Cited

U.S. PATENT DOCUMENTS

| | | | | |
|---|---|---|---|---|
| 3,586,818 A | * | 6/1971 | Blake | 219/137 R |
| 5,618,449 A | * | 4/1997 | Houman et al. | 219/69.11 |
| 5,813,074 A | * | 9/1998 | Liljeholm | 15/21.1 |
| 6,369,357 B1 | * | 4/2002 | Baum et al. | 219/136 |
| 6,391,093 B1 | * | 5/2002 | French et al. | 95/226 |

FOREIGN PATENT DOCUMENTS

| | | | |
|---|---|---|---|
| JP | 57-008275 A | * | 1/1982 |
| JP | 57-206575 A | * | 12/1982 |

* cited by examiner

Primary Examiner—Lynne R. Edmondson
(74) Attorney, Agent, or Firm—Howard & Howard (57) ABSTRACT

Various methods, systems and products are disclosed for providing an improved welding system which substantially improves the continuous operation of an automated welding system by increasing the amount of time between maintenance shutdowns.

54 Claims, 8 Drawing Sheets

IMPLEMENTATION SYSTEM FOR CONTINUOUS WELDING, METHOD, AND PRODUCTS FOR IMPLEMENTATION OF THE SYSTEM AND/OR METHOD

This application is a continuation-in-part application of U.S. patent application Ser. No. 10/012,591, filed Nov. 10, 2001, which is a continuation application of U.S. patent application Ser. No. 09/499,199 filed on Feb. 7, 2000, for "Implementation System for Continuous Welding, Method, and Products for Implementation of the System and/or Method", now U.S. Pat. No. 6,369,357.

FIELD OF THE INVENTION

The subject invention relates to systems and/or methods of use for significantly increasing the amount of time between maintenance shutdowns in an automatic continuous welding application for an automated welding machine. Also disclosed are products which can be used to accomplish some of the steps of the processes or systems disclosed.

BACKGROUND

In the industry, various welding systems and processes are employed to weld two pieces of metallic material. For example, a diffusion nozzle (or nozzles in the case of twin electrodes) of a continuous electrode is moved near an article or articles to be welded, and an arc is established between the continuous electrode and the article or articles to be welded, so as to raise the temperature of the article or articles to be welded to the point at which the parts locally melt. Throughout the welding process an inert gas is dispensed through a gas diffuser disposed adjacent the nozzle to keep the molten metal at the weld engulfed in a controlled atmosphere. The controlled atmosphere controls the characteristics of the weld deposit as well as excluding air. Alternatively, a gasless wire tube may be used. The gasless wire tube contains chemicals which produce gas. The gases that cause the most difficulty in welding are atmospheric gases, particularly, hydrogen or $H_2O$. When any welding process is used, the molten puddle creating the weld should be shrouded or shielded from the air in order to obtain a high quality weld deposit. This can also help arc ignition and the transfer of electrode to pieces welded for a smoother weld.

A problem typically arises with this type of welding whereby spatter builds up on the front end of the torch, e.g., including a welding nozzle, tip and gas diffuser. Spatter is developed as molten metal droplets from the electrode and molten metal being welded are expelled and strike against the nozzle, tip and gas diffuser. The droplets of molten metal solidify and adhere to surfaces of the front end of the torch as deposits of spatter. When a significant amount of spatter accumulates on the surface of the nozzle, tip or gas diffuser adjacent the nozzle, the flow of inert gas to the weld is disturbed and becomes uneven.

Conventionally, spatter is removed by using a brush as disclosed in Japanese Patent Application Laying Open Publication Ser. No. 59-73186 (1984), or by using a device with rotary blades to scrape the spatter from the nozzle as disclosed in Japanese Utility Model Application Laying Open Publication Ser. No. 58-47381 (1983). However, the usefulness of these methods is limited as direct contact with the welding nozzle is likely to cause damage to the welding nozzle, and the brushing or scraping of the welding nozzle is extremely time and labor intensive. Another approach involves the use of ceramic welding nozzles, instead of metal welding nozzles, as disclosed in Japanese Utility Model Application Laying Open Publication Ser. No. 48-12323 (1973). However, even though the use of ceramic material reduces the amount of spatter accumulation, spatter removal must still be performed, and a ceramic welding nozzle is even more susceptible to damage when the spatter is removed by scraping or brushing. In all of these cases it is necessary for the operator to be in close proximity to the welding nozzle in order to remove the spatter, which may lead to injuries, such as when an operator is burned by the extremely hot welding nozzle while trying to clean it by hand.

In order to make the process more streamlined, and to reduce the danger to the operator, spatter may be removed from the welding nozzle by inserting the welding nozzle within an electromagnetic field that magnetically pulls the spatter accumulation from the welding nozzle. A product performing this function is disclosed in U.S. Pat. No. 4,838,287. This product allows the spatter accumulation to be removed with no physical contact to the welding nozzle and with no requirement for the operator to get close enough to the welding nozzle to be burned. This product also can be utilized with an automated welding system application such that the electromagnetic cleaner is placed within reach of an automated welding system, where periodically the automated welding system would automatically move the welding nozzle over to the cleaning station to have the spatter accumulation removed. The product allows the automated welding system to clean the nozzle and continue operation without being shut down. Since the welding nozzle is cleaned often, the life of the welding nozzle is also increased so that it need not be replaced as often as it would without the cleaning procedure.

However, this product does not work well with a metal welding nozzle because the spatter bonds very strongly to the metal welding nozzle. Typically this product will only be used effectively with a welding nozzle made from either a ceramic or a carbon composite material. Characteristics of carbon composite or ceramic materials make welding nozzles made therefrom resistant to adhesion and to pitting. The resistance to adhesion allows the use of the electromagnetic cleaner to efficiently remove spatter from the various elements of the ceramic or carbon composite welding nozzles.

In process, the ceramic or carbon composite welding nozzle may be dipped in water prior to cleaning in order to solidify the spatter. The electromagnetic field will not be effective if the spatter is in a liquid or molten state, so the water dip is necessary to insure that the spatter is completely hardened. After dipping the welding nozzle in water, the welding nozzle is moved to the electromagnetic station and the hardened spatter droplets are pulled off magnetically.

Another measure utilized to prevent spatter accumulation or to at least make spatter removal easier are anti-spatter compounds. These compounds can be liquid, gel, or an aerosol spray. When placed on the welding nozzle, the anti-spatter agent will act as a barrier between the molten droplets of metal and the welding nozzle to either prevent or weaken the bond to the welding nozzle after the molten metal droplets cool. Use of an anti-spatter compound generally slows the accumulation of spatter on the welding nozzle and makes for the easier removal of any spatter that accumulates on the welding nozzle. However, the usefulness of the anti-spatter compounds is limited in that unless applied before each weld, the anti-spatter compound will be consumed with successive welds, thereby requiring frequent shutdowns of the welding operation to manually apply fresh anti-spatter compound to the welding nozzle. Each stop makes the cycle time longer, and also requires an operator to manually apply the anti-spatter compound. Generally, the use of anti-spatter compounds in this manner has had minimal beneficial effects due to the labor-intensive nature of the application in any manufacturing setting.

Welding contact tip is another significant cause of downtime on a welding operation. As a contact tip is used, it wears out due to arcing and abrasion. Friction and/or conductivity between the continuous electrode and the passage for the electrode in the contact tip causes the passage in the welding nozzle to become out of round and enlarged, which, in turn, permits the continuous electrode to move around in an uncontrolled manner within the passage. Such action eventually causes inaccuracy in the weld and eventually requires that the contact tip be replaced. To prevent or postpone this wear on the contact tip, feeders have been developed to feed the continuous electrode to the contact tip in a defined manner, because some contact between the electrode and the contact tip has been found to bear on the repeatable accuracy of the weld. Lubricants can also be applied to the continuous electrode to reduce the function between the continuous electrode and the contact tip.

SUMMARY OF THE INVENTION AND ADVANTAGES

Various methods and/or systems are disclosed for providing an improved welding system and/or method that substantially improves the length of time of continuous operation for an automated welding system between maintenance shutdowns. One of the disclosed method steps or system elements provides for dipping a welding nozzle or tip and a portion of its related diffuser into a bath of fluid each time the automated welding system moves through a welding cycle. A product that may best accomplish this step or element is also disclosed.

Another method step or system element may include the removal of spatter accumulation via an electromagnetic field that magnetically pulls the spatter without direct contact with the nozzle or diffuser. A further disclosed method step or system element includes lubrication of the continuous electrode used for welding, and may include a step prior to lubrication that involves cleaning the continuous electrode prior to adding lubricant. The steps may vary as to whether or not they are included, or in what sequence, in accordance with such factors as the type of material used for the tip, the feeder used, the type of continuous electrode used, the type of spatter removal system to be used, the welding apparatus used, the welding environment (such as the inert gases used), and the welding application, i.e., what material is being welded to what material, and other factors. In each system or combination of method steps disclosed, however, a significant increase in time of continuous operation between maintenance shutdowns has occurred, providing significant cost savings and higher productivity for the same machine. Products for implementing the systems and/or methods are also disclosed, as well as a product that will hold or combine various products as needed for a selected system and/or method.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 5:
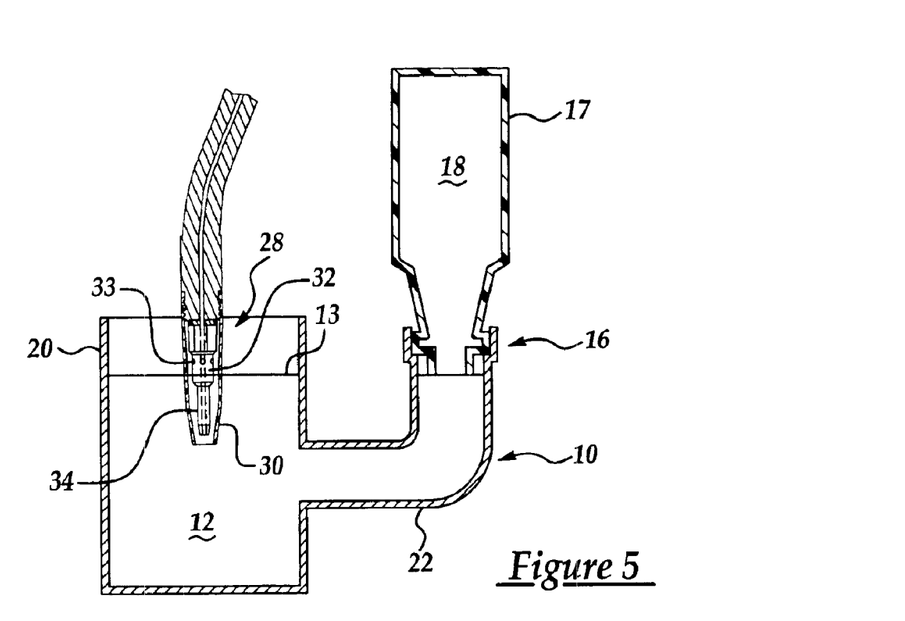
FIG. 5a is a cross sectional view of the fluid bath apparatus having a release agent included in the fluid.
FIG. 5b is a cross sectional view of the fluid bath apparatus having no release agent included in the fluid.
Figure 5A:
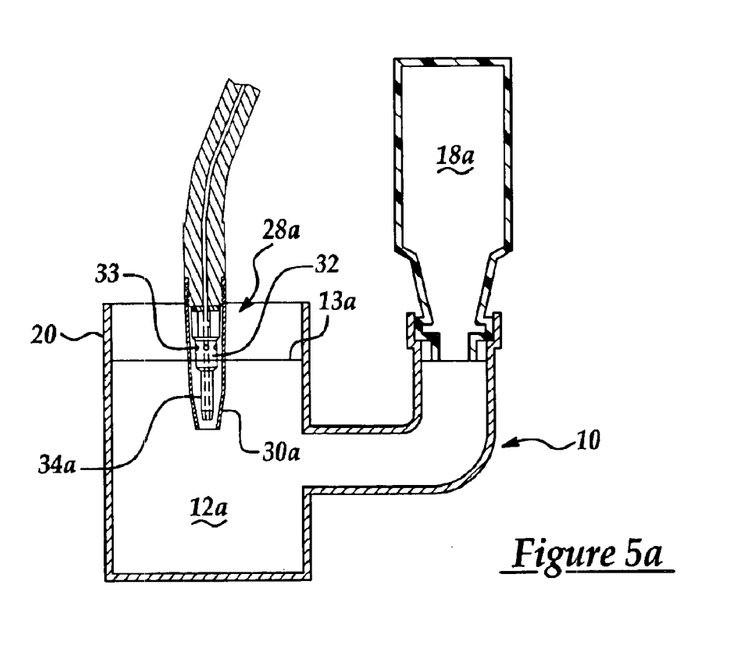

Referring to the FIGS., wherein like numerals indicate like or corresponding parts throughout the several views, with particular reference to FIG. 5a, an apparatus 10 for providing a bath 12 of a fluid to an automated welding system 14 is shown at 10. The apparatus 10 includes a port 16 for the adaptation of a feed container 17 of fluid 18, a reservoir 20 which is accessible to atmosphere, and a passageway 22 for communication between said feed container 18 and said reservoir 20. The port 16 is preferably comprised of a connection between a threaded spout 15 to the feed container 17 containing the fluid 18 and a mated threaded inlet 19 to the passageway 22. The apparatus 10 further provides means for maintaining the fluid bath 12 at a constant level within the reservoir 20 until the feed container 18 is exhausted. The relationship between the reservoir 20 and the feed container 18 is such that the apparatus 10 provides a balance between the surface tension of the fluid within the reservoir 20 and in contact with the atmosphere against the head created by the feed container 18 in communication with said passageway 22. This relationship allows the level of the fluid bath 12 within the reservoir 20 to be maintained at a constant level as long as additional fluid remains within the feed container 18. As the fluid bath 12 within the reservoir 20 is used, the volume of the fluid bath 12 within the reservoir 20 is replenished via the passageway 22 between the reservoir 20 and the feed container 18. Additionally, a level sensor 11 may be used to detect a low level within the fluid bath 12. If a low level is detected, then the welding system 14 may be shut down.

Figure 3:
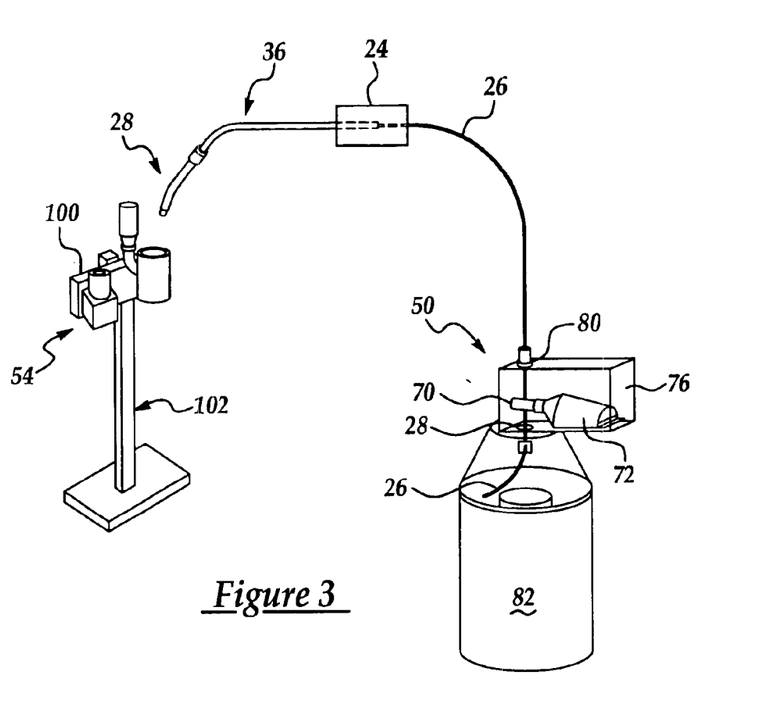
FIG. 3 is a schematic view showing a continuous electrode, lubricating device, feed mechanism, welding nozzle, and the fluid bath apparatus as used in FIG. 1.

With reference to FIG. 3, an example method of using the apparatus 10 to increase the duty cycle of an automated welding system 14 is shown. The automated welding system 14 includes a torch 25.

In one embodiment, the torch 25 includes a front end 26. The front end 26 includes a nozzle 30, a gas diffuser 32, and a contact tip 34. The torch 26 is connected to a robot 36. A conduit 31 is also coupled to the torch 25 for supplying material to the torch 25, e.g., gas, water, and a continuous electrode (see below).

The method includes the steps of using a continuous electrode feeder device 24 to feed the continuous electrode 26 to and through the contact tip 34, applying a friction reducing agent to the continuous electrode 26 as it is fed by said feeder device 24 to said contact tip 34, dipping said front end 28 into a fluid bath 12 contained within said reservoir portion 20 of said apparatus 10 following a welding cycle, and utilizing a spatter removal device, such as an electromagnetic spatter removal system 54, to remove spatter from said front end 28. The continuous electrode feed mechanism 24 is used to insure that the continuous electrode 26 is consistently and smoothly feed to the contact tip 34, and the friction reducing agent is applied to increase the feedability of continuous electrode 26 into and through the contact tip 34. The friction reducing agent is preferably applied by means of a continuous electrode lubricator 50 having an applicator 70 fed via a wicking action from a reservoir 72, which can be disposed in a housing 76, having a inlet passageway 78 and an outlet passageway 80. The housing 76 is preferably disposed between the feeder 24 and the supply container 82 (or source) for the continuous electrode 26. A cleaner may also be applied to the continuous electrode 26 utilizing a similar device (not shown) located adjacent the continuous electrode lubricator 50.

As discussed above, in one embodiment, each torch 25 has a front end 28 which may be comprised of a nozzle 30, a gas diffuser 32, and a contact tip 34. Alternatively, the front end 28 could include a flux core wire continuous electrode, a gasless wire tube and/or a nozzle. The flux core wire continuous electrode includes chemicals that produce the gas.

The torch 25 is mounted to the robot arm 36 in a conventional manner. The gas diffuser 32 is connected to a source of preferable inert gas. Holes 33 in the gas diffuser 32 distribute the gas into the welding nozzle shroud 30 to control the welding environment at the weld.

Figure 6A:
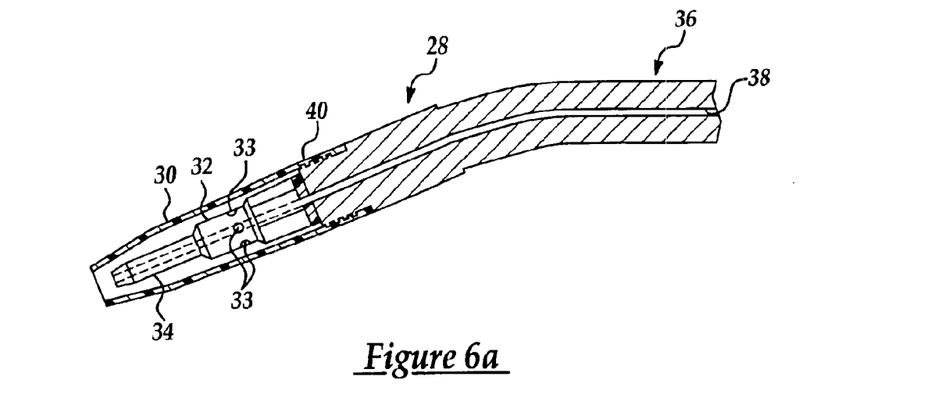
FIG. 6a is a cross sectional view of a metal welding nozzle.

With reference to FIG. 6a contact between the contact tip 34 and the continuous electrode 26 is desirable for stability and repeatability of electrode feed, but will cause the feed hole 35 in the contact tip 34 to become out of round or enlarged at some point, thereby requiring more frequent replacement of the contact tip 34, if high abrasiveness and arcing exist. Use of the friction reducing agent on the continuous electrode 26 will help maintain conductivity between the continuous electrode 26 and the contact tip 34, which increases the life of the contact tip 34 for repeatable welding of the parts to be welded.

For metal welding nozzles, the fluid bath 12 consists of a release agent, a solution of water and a release agent, or water. The release agent is used to prevent liquefied spatter that is deposited on the front end 28 of the torch 25 from forming a strong bond. Additionally, by quenching the front end 28 of the torch 25 in the fluid bath 12 between welding cycles, the front end 28 is repeatedly heated and cooled. The unequal rates of expansion and contraction of the spatter and the components of the front end 28 also work to remove the spatter from the front end 28. The fluid bath 12 including the release agent is kept at a cool temperature in order to facilitate the hardening of the liquefied spatter. The temperature of the fluid bath 12 is dependent on the amount of time which the front end 28 of the torch 25 is immersed within the release agent. The temperature of the fluid bath 12 including the release agent must be cool enough to cause the liquid spatter to completely harden within the amount of time that front end 28 of the torch 25 is immersed. Typically, a release agent must be used when a welding nozzle 30 composed of metal is utilized due to the high strength bonding which occurs between the spatter and the metal nozzle 30. The release agent is necessary to insure that the bonding between the front end 28 and the spatter is inhibited sufficiently to allow the spatter to be removed without damaging the front end 30.

Typically, as shown in FIG. 5a, the front end 28 is dipped into the fluid bath 12 so that the surface 13 of the fluid bath 12 is disposed adjacent the holes 33 of the gas diffuser 32, e.g., ¼ inch, so that no fluid enters the inside of the gas diffuser 32 via the diffusion holes 33 at any time.

After the front end 28 has been dipped within the fluid bath 12 including the release agent, the front end 28 is then removed from the fluid bath 12 and positioned at its next station above a spatter removal system 54. In one embodiment, the spatter removal system 54 is an electromagnetic spatter removal system 54. The spatter must be completely hardened in order for the electromagnetic spatter removal system 54 to work correctly. The electromagnetic spatter removal system 54 uses magnetic fields to attract the spatter and pull the spatter from the front end 28, such as that described above and shown in U.S. Pat. No. 4,838,287. This process step or system element will not work on spatter that is still liquefied. In one embodiment, the steps or elements of dipping the front end 28 within the fluid bath 12 including the release agent and subsequently utilizing the electromagnetic spatter removal device 54 are performed periodically each time the automated welding system 14 cycles a predetermined number of times.

Figure 6B:
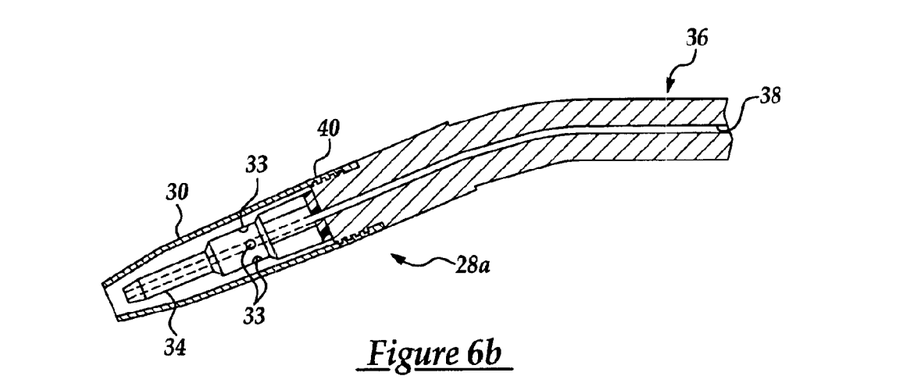
FIG. 6b is a cross sectional view of a nonmetal welding nozzle.

A different example method or system of using the fluid bath apparatus 10 to increase the duty cycle (i.e., on duty, between shutdowns) of an automated welding system 14 includes the steps or elements of using a continuous electrode feed mechanism 24 to feed the continuous electrode 26 to a contact tip 34 of a front end 28a of a torch 25, applying a friction reducing agent to the continuous electrode 26 as it is fed through the feed device 24 to the contact tip 34, dipping the front end 28a into a fluid bath 12 contained within said reservoir portion 20 of said apparatus 10 following a welding cycle (preferably where the surface of the fluid bath is disposed approximately ¼ inch from the holes 33 of the gas diffuser 32), and utilizing an electromagnetic spatter removal system 54 to remove spatter from said front end 28a. In place of the metal nozzle 30, however, a ceramic nozzle 30a is utilized. A ceramic welding nozzle 30a is more resistant to bonding of the spatter, thereby making the spatter removal easier. The inherent resistance to bonding displayed by the ceramic welding nozzle 30a makes the use of a release agent in the fluid bath 12 unnecessary. Therefore, instead of dipping the front end 28a into a fluid bath 12 of water and a release agent, the front end 28a is dipped into a fluid bath 12a consisting of only water. Just as with the release agent, the water only fluid bath 12a must be kept at a temperature which will allow the spatter to completely harden upon the front end 28a prior to utilizing the electromagnetic spatter removal system 54.

An additional example method of using the fluid bath apparatus 10 to increase the duty cycle of an automated welding system 14 includes only using the steps or elements of using a continuous electrode 26 feed mechanism to feed the continuous electrode 26 to a contact tip 34, dipping said front end 28 into a fluid bath 12 contained within the fluid bath 12 of said fluid bath apparatus 10 following a welding cycle, and utilizing an electromagnetic spatter removal system 54 to remove spatter from said front end 28. As previously discussed, the method can be practiced using a front end 28a having a nozzle 30a made from ceramic materials rather than metal and dipping the front end 28a within a fluid bath 12a of only water rather than a release agent to harden the spatter deposited on the welding tip 28a. Alternatively, if a metal nozzle 30 is used, a release agent plus water is recommended.

An additional example method of using the fluid bath apparatus 10 to increase the duty cycle of an automated welding system 14 includes the steps of using a continuous electrode feed mechanism 24 to feed the continuous electrode 26 to a contact tip 34, dipping said front end 28 into a fluid bath 12 of said apparatus 10 following a welding cycle, and using a scraper or brush to remove the hardened spatter from the front end 28. An impact device or a reamer may be other alternatives to remove the hardened spatter from the front end 28. As previously discussed, the method or system can be practiced using a metal welding nozzle 30 and a fluid bath 12 including a release agent (or a solution of a release agent and water), or a ceramic welding nozzle 30a and a water fluid bath 12a to harden the spatter deposited on the welding nozzle 30 or 30a, respectively. Although the electromagnetic spatter removal system 54 is not utilized in the present method, the release agent or water must still be maintained at a temperature which will facilitate the complete hardening of the spatter deposited on the welding nozzle 30 or 30a, respectively. Removal of the spatter by scraping, brushing, reaming, or impacting does involve some manual labor, but the removal process has been found to be more efficient than those previously known, particularly when the spatter is completely hardened by the dipping of the front end 28 or 28a in the fluid bath 12 or 12a, respectively. The steps or elements of dipping the front end 28 or 28a within the fluid bath 12 or 12a and subsequently removing the hardened spatter by brushing, scraping, reaming, or impacting the hardened spatter from the front end 28 or 28a are performed periodically at shutdown subsequent to each time the automated welding system 14 cycles a predetermined number of times. This method will improve the amount of time between shutdowns, but is not recommended to be as significant as the other methods and/or systems described above.

Figure 1:
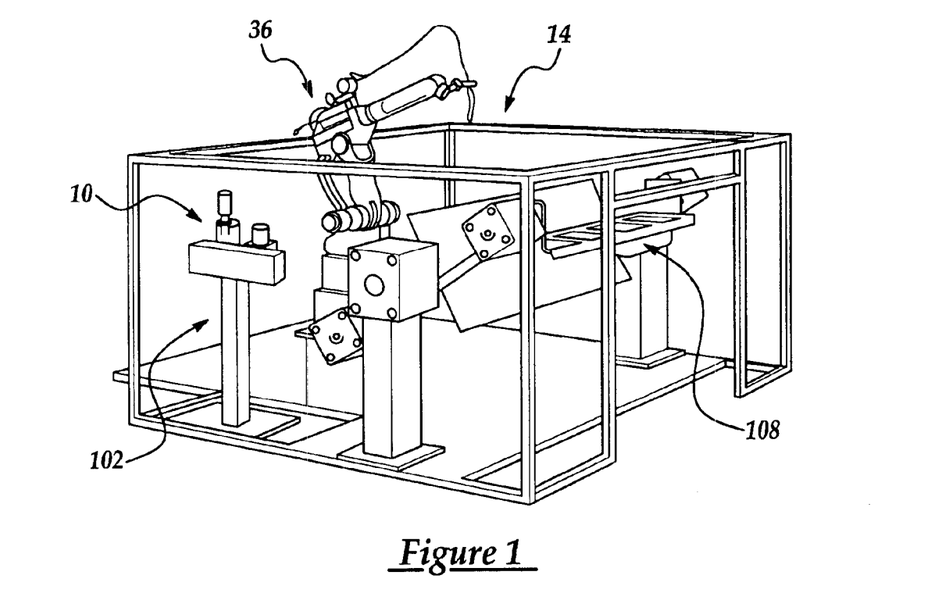
FIG. 1 is a perspective view of an automated welding system.
Figure 2:
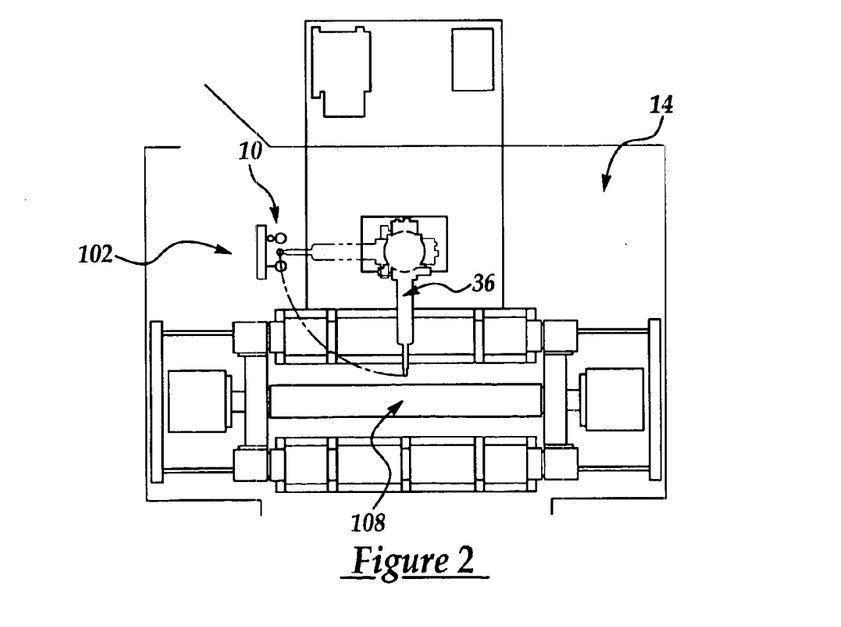
FIG. 2 is a top view of the automated welding system of FIG. 1.
Figure 4:
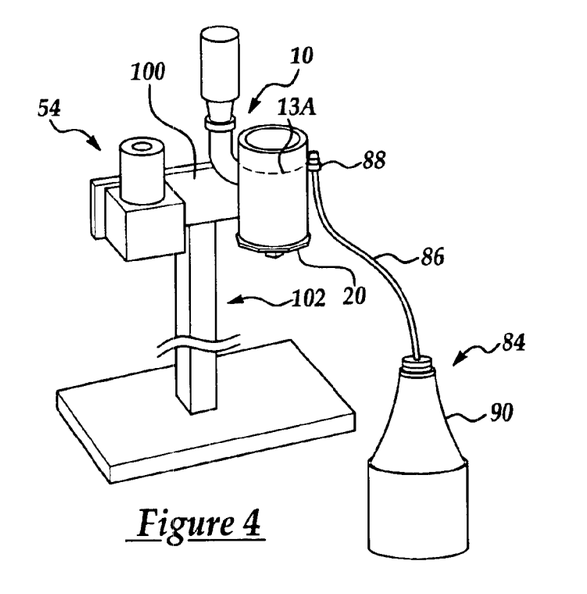
FIG. 4 is a perspective view of the fluid bath apparatus mounted to a common bracket along with an electromagnetic spatter removal system as shown in FIG. 1.

Referring to FIGS. 1 and 2, an automated welding system utilizing the fluid bath apparatus 10 is shown at 14. Referring to FIG. 3, a schematic-is shown which details the path of the continuous electrode 26 as it is fed from a spool through a continuous electrode lubricator 50 to the contact tip 34, FIGS. 3 and 4 illustrate the mounting of the fluid bath apparatus 10 via bolt fasteners or similar fasteners onto a bracket 100 along with the electromagnetic spatter removal system 54, similarly mounted with bolt fasteners or similar fasteners. As shown in FIG. 4, this bracket 100 is then affixed to a stand 102 via suitable fasteners (or may be fastened by welding or any other desired type of fastening that will retain its fastening in the environment in which the robot is maintained). The stand 102 is placed in a suitable location, as shown in FIG. 4, to be reached by the robot arm 36 for placement of the front end 28 or 28a at an appropriate time in the cycle.

With reference to FIGS. 1 and 2, the stand 102 is preferably placed within the automated welding system 14, but away from the area 108 in which welding is performed. For example in the illustrated embodiment, the stand 102 is disposed at a location approximately 90 degrees clockwise from the working area 108 as viewed from above. At should be noted that 90 the location of the stand 102 is dependent upon the application and may be placed at a location other then 90 degrees from the working area 108. The fluid bath apparatus 10 and the electromagnetic spatter removal system 54 are placed in sequence on the stand 102 so that one is less than 90 degrees clockwise from the work area 108 as viewed from above and the other is more than 90 degrees clockwise from the work area 108 as viewed from above, so that the operation steps or elements can be sequential, if so desired.

Returning to FIG. 4, in one embodiment, the bath 12 includes a bleeder apparatus 84 coupled to the reservoir 20. The bleeder apparatus 84 includes a bleeder line 86 coupled to the reservoir 20 by a coupler 88 at one end and to an overflow container 90. The bleeder apparatus 84 is adapted to catch any overflow from the reservoir 20 to maintain fluid level within the reservoir 20 at the fill line 13a. The overflow is held in the overflow container 90 and may be emptied into the fluid container 17.

Figure 7:
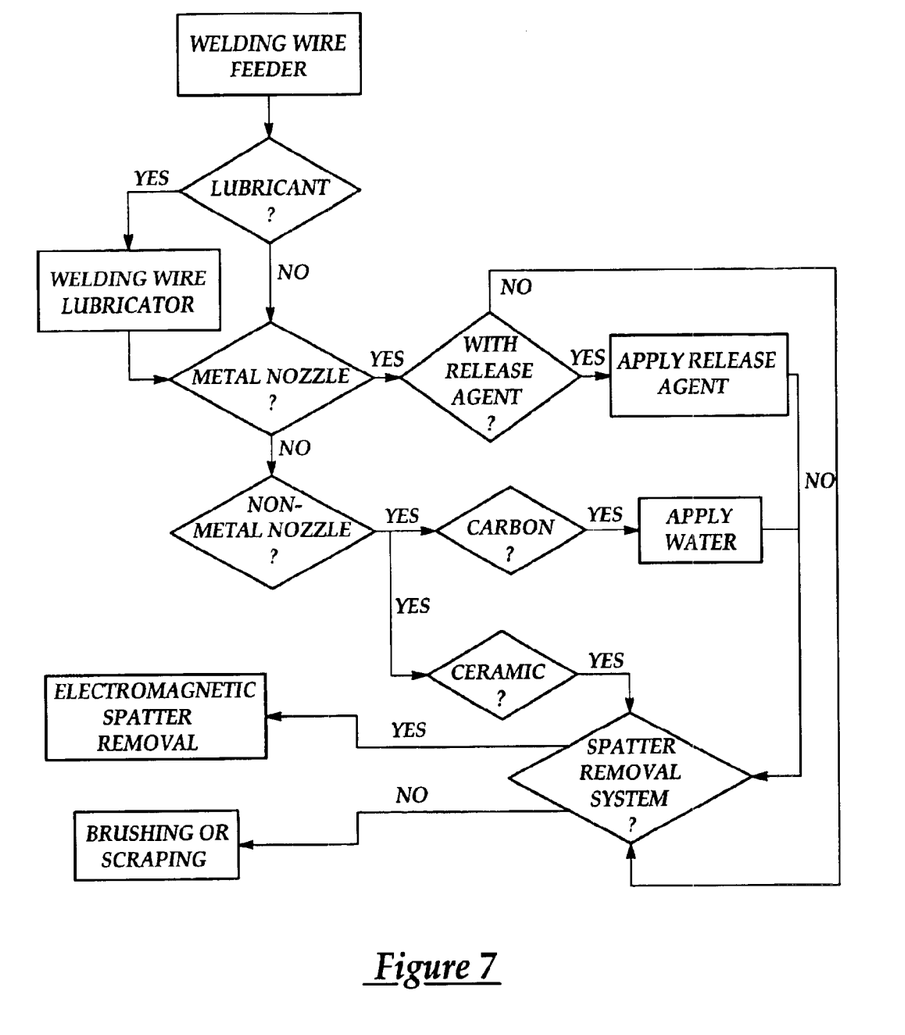
FIG. 7 is a flow diagram outlining possible methods or systems of using the various components of the automated welding system.

Referring to FIG. 7, a flow chart is shown which illustrates the possible methods or systems of use as described above. As shown, the flow chart begins with a continuous electrode feed mechanism 24 that may be used to feed the continuous electrode 26 from a spool to the contact tip 34. A continuous electrode lubricator 50 may be located immediately after the spool to apply lubricant to the continuous electrode 26. The lubricant will reduce friction as the continuous electrode 26 is fed to the contact tip 34, and will reduce friction between the contact tip 34 and the continuous electrode 26 as the continuous electrode 26 passes through the contact tip 34. Reduced friction and increased conductivity between the contact tip 34 and the continuous electrode 26 will reduce the amount of wear on the contact tip 34, thereby increasing the life of the contact tip 34. As shown in FIG. 7, the use of a continuous electrode lubricator 50 is optional, although it is preferable, but the method can be practiced without the continuous electrode lubricator 50 at an improved efficiency, but less than the efficiency with the use of the lubricator 50.

The welding nozzle 30, 30a can be made of either metal or ceramic material. If the welding nozzle 30 is made from metal, then the welding nozzle 30 is preferably dipped within a fluid bath 12 consisting of a release agent or a solution of water and a release agent. The release agent is used to prevent liquefied spatter that is deposited on the front end 28 from forming a strong bond to the surfaces of the front end 28, and is kept at a cool temperature in order to facilitate the hardening of the liquefied spatter as described above.

If the welding nozzle 30a is made from a non-metal material, then the welding nozzle 30a is dipped within a fluid bath 12a of only water if it is a carbon nozzle. If the nozzle 30a is a ceramic nozzle, it need not be dipped other than if the spatter needs to be cooled, in which case some improvement over other uses of ceramic nozzles can be maintained. Thus, with ceramic nozzles this step is optional. The inherent resistance to bonding displayed by the carbon or ceramic welding nozzle 30a makes the use of a release agent less effective. Therefore, instead of dipping the front end 28 into a fluid bath 12 of water and a release agent, the front end 28a is dipped into a fluid bath 12a consisting of only water. Just as with the fluid bath 12 including the release agent, the fluid bath 12a of water must be kept at a temperature which will allow the spatter to completely harden upon the welding tip 28a. The fluid bath apparatus 10 is used to present the fluid bath 12a to the front end 28a in a manner that the front end 28a can be dipped within the solution as described above.

After the front end 28 or 28a has been dipped within the fluid bath 12 or 12a (or otherwise as indicated in FIG. 7 as to ceramic nozzles), then the front end 28 or 28a is positioned so that any spatter which has accumulated upon the front end 28 or 28a can be removed by either an electromagnetic spatter removal system 54, by brushing, reaming, scraping, or impacting (such as with a hammer), using ultrasonic, or other force, the spatter from the front end 28 or 28a. The electromagnetic spatter removal system 54 uses magnetic fields to attract the spatter and pull the spatter from the front end 28 or 28a. If the electromagnetic spatter removal system 54 is not used, then any spatter that has accumulated upon the front end 28 or 28a can be removed manually by either scraping, brushing, reaming or otherwise impacting the spatter from the front end 28 or 28a. The steps of dipping the front end 28 or 28a within the release agent or water and subsequently utilizing the electromagnetic spatter removal device 54 or scraping, reaming, brushing or otherwise impacting the spatter from the front end 28 or 28a are performed periodically each time the automated welding system 14 cycles a predetermined number of times.

Figures 8A, 8B, 8C:
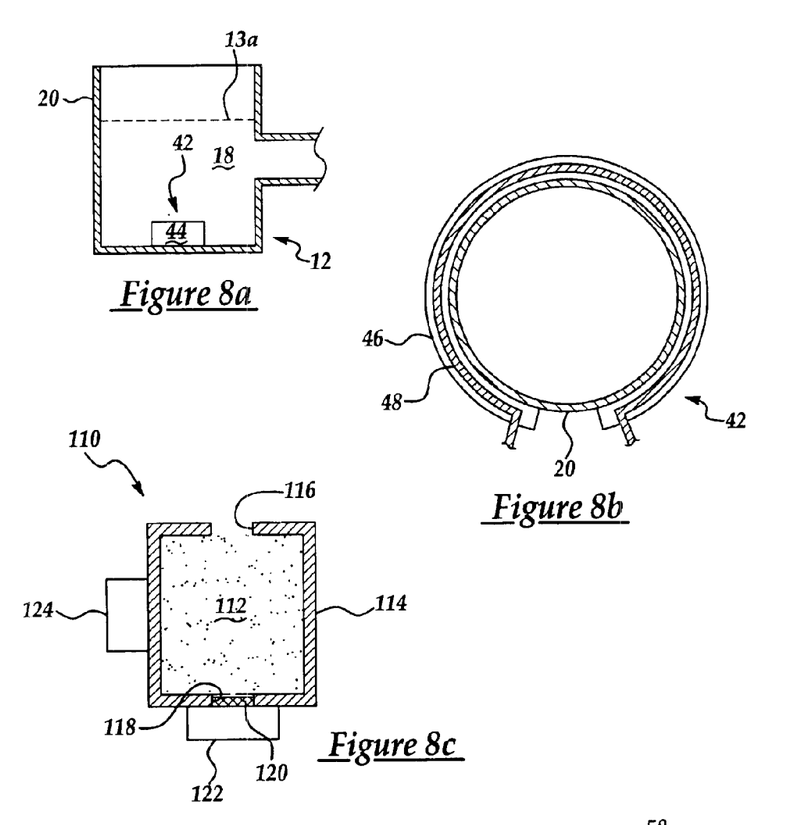
FIG. 8a is a cross sectional view of the fluid bath apparatus having a cooling system, according to an embodiment of the present invention.
FIG. 8b is a top view of the fluid bath apparatus having a cooling system, according to another embodiment of the present invention.
FIG. 8c is a cross sectional view of a torch chiller, according to an embodiment of the present invention.

With reference to FIGS. 8a and 8b, in one aspect of the present invention, the bath 12 includes a cooling system 42. Heat from the front end 28 or 28a is transferred to the fluid 18 within the bath 12. The cooling device 42 helps to eliminate heat from fluid 18 within the bath 12. Thus, the bath 12 may be smaller relative to the front end 28 or 28a.

With specific reference to FIG. 8a, in one embodiment, the cooling system 42 includes a solid state cooling element 44, such as a Peltier Device, within the reservoir 20. A Peltier Device is a solid state thermoelectric module which acts as a heat pump.

With specific reference to FIG. 8b, in another embodiment, the cooling system 42 includes an element 46 wrapped around or in contact with at least a portion of the reservoir 20. The element 46 may be cooled with a refrigerant, such as freon or liquid nitrogen or other cooled liquid. The element 46 includes one or more tubes or passageways 48 through which the refrigerant flows. The element 46 may be outside the reservoir 20, as shown, or inside the reservoir 20. Apparatus for cooling refrigerants and flowing the refrigerant through tubes are well known in the art and are therefore not further discussed.

Figure 9A:
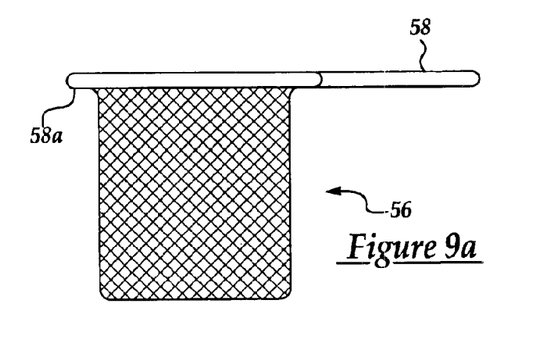
FIG. 9a is a view of a net for use with the fluid bath apparatus, according to an embodiment of the present invention.
Figure 9B:
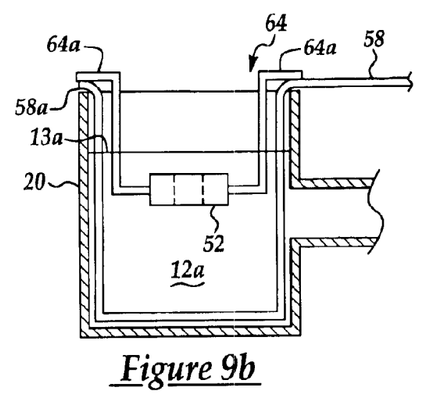
FIG. 9b is a cross sectional view of the net of FIG. 9a, the fluid bath apparatus, and a magnetic device, according to an embodiment of the present invention.
Figure 9C:
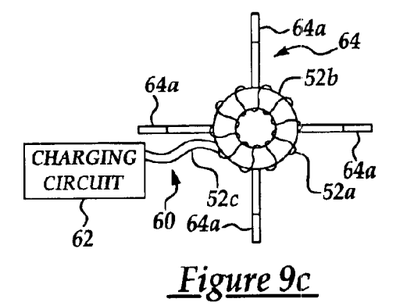

With reference to FIGS. 9a, 9b, and 9c, in another aspect of the present invention, the electromagnetic spatter removal system 54 includes a magnetic device 52 disposed within the fluid 18 in the reservoir 20. In one embodiment, the magnetic device 51 is a magnet disposed within the bath torch 12. In another embodiment, the magnetic device 52 is an electromagnetic coil device adapted to be energized by the electromagnetic spatter removal system 54 when the front end 28 or 28a is inserted into the bath 12. Energization of the electromagnetic coil device 52 creates a magnetic field. The magnetic field created by energization of the electromagnetic coil or the magnetic field created by the magnet operates to remove spatter from the front end 28 or 28a.

A wire basket or net 56 is adapted to be inserted into the bath 12 to catch or contain the spatter removed from the front end 28 or 28a. The basket 56, in one embodiment, is composed of stainless steel. In an alternate embodiment, the basket 56 is composed of plastic. The basket 56 is designed to catch the spatter removed from the nozzle 28 by the electromagnetic spatter removal system 54. The basket 56 includes a handle 58 by which the basket 56 may be removed from the reservoir 20 and emptied. The basket 56 also includes a lip 58a which rests along the top edge of the reservoir 20. The basket 56 may be rigid or collapsible.

In the illustrated embodiment, the electromagnetic coil device 52 includes a coil 52a wrapped about a base 52b. A pair of leads 60 connects the coil 52a to a charging circuit 62 of the electromagnetic spatter removal system 54. The base 52b is connected to a support structure 64 which supports the electromagnetic coil device 52 such that the device 52 in below the fill line 13a of the reservoir 20. The support structure 64 includes a plurality of arms 64a which extend away and in a direction up (in FIG. 9b) from the base 52b. The arms 64a are adapted to rest on top of the basket 56 and thereby removable position the electromagnetic coil device 52 within the reservoir 20.

In one embodiment, the coil 52a and the leads 52c are electrically insulated, e.g., coated or sheathed in insulating plastic or rubber. In another embodiment the fluid 18 within the reservoir 20 is non-conducting.

In operation, when the front end 28 or 28a is inserted into the bath 12, the electromagnetic spatter removal system 54 energizes the coil 52a via the charging circuit, thereby, creating a magnetic field which acts to remove spatter from the front end 28 or 28a. The spatter is contained within the basket 56 and can thereafter be removed from the bath 12.

Figure 10A:
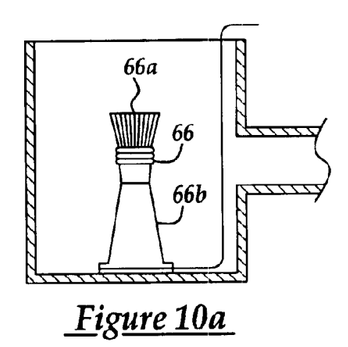
FIG. 10a is a cross sectional view of the fluid bath apparatus with a brush, according to an embodiment of the present invention.
Figure 10B:
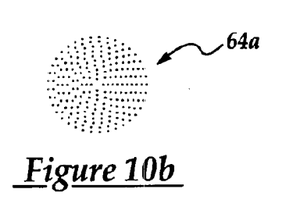
FIG. 10b is a top view of the brush of FIG. 10a, according to an embodiment of the present invention.
Figure 10C:
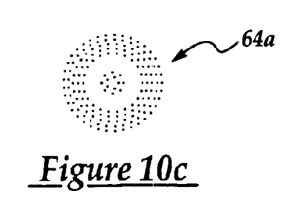
FIG. 10c is a top view of the brush of FIG. 10a, according to another embodiment of the present invention; and, FIG. 11 is a cross-sectional view of the fluid bath apparatus with a brush and a magnetic device, according to an embodiment of the present invention.

With reference to FIGS. 10a, 10b, and 10c, in another embodiment the bath 12 includes a brush 66 within the reservoir 20. The brush 66 may be composed of stainless steel. The brush 66 is positioned such that the front end 28 or 28a is inserted into the brush 66 when inserted into the reservoir 20. The brush 66 is used to remove spatter from the front end 28 or 28a when the front end 28 or 28a is inserted therein. The brush 66 includes a plurality of bristles 66a. In one embodiment, as shown in FIG. 10b, the bristles 66a are in a circular pattern. In another embodiment, as shown in FIG. 10c, the bristles 66a are in a donut shaped pattern. The donut shaped pattern corresponds to the shape and dimensions of the nozzle 28.

Figure 11:
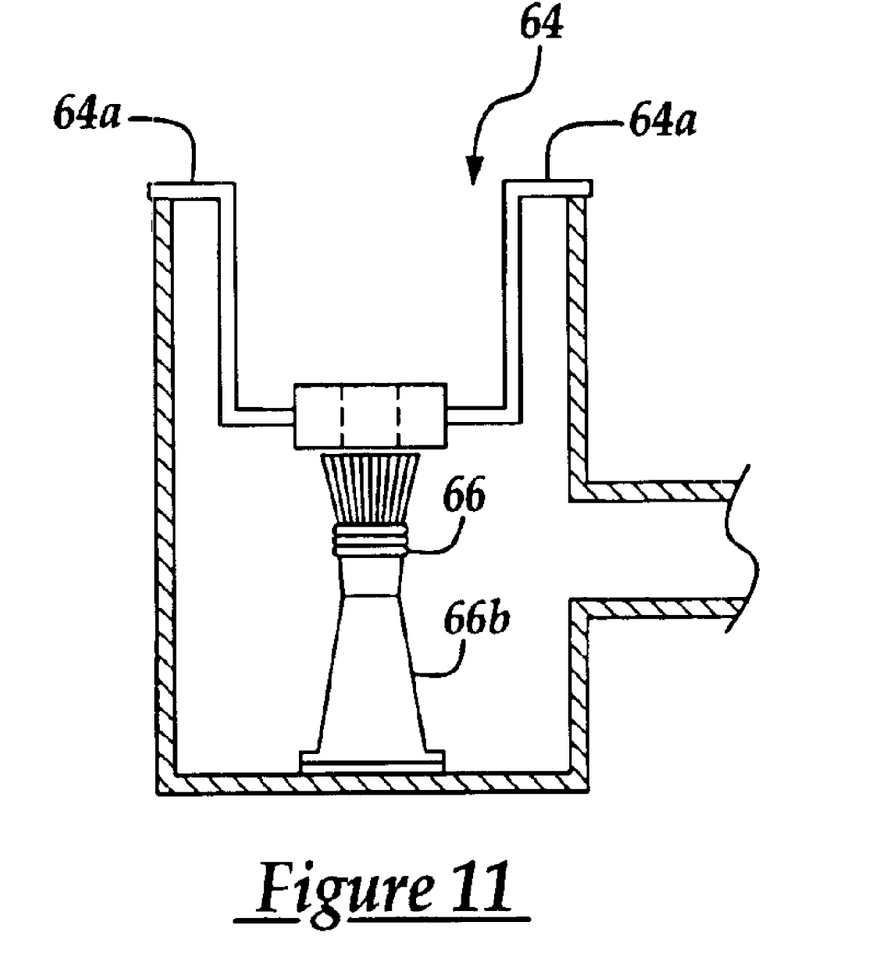

Returning to FIG. 10a, in one embodiment the brush 66 is coupled to the bottom of the reservoir 20 via a bracket 66b. In another embodiment, the brush 66 is coupled to the bottom of the basket 56. As above, the basket 56 may be removed to remove the spatter from the reservoir 20. The brush 66 and basket 56 combination may be used with or without the electromagnetic coil device 52 of FIGS. 9a–9c. If the brush 66 is used with the electromagnetic coil device 52, the brush 66 may be connected either the basket 56 or the base 52 or support structure 66 (see FIG. 11).

With reference to FIG. 8c, in another aspect of the present invention, a torch chiller or cooler 110 may be utilized to cool the front end 28 of the torch 25 to remove spatter from the front end 28. The torch cooler 110 may be use used independently or in combination with the other spatter removal devices. In one embodiment of the present invention, the torch cooler 110 contains a cooling material 112 which may be in the form of a fluid (liquid or gas) or solid. Examples of liquids that may be suitable include, but are not limited to, oil, a mixture of oil and water, anti-freeze solutions (such as those containing ethylene glycol and propylene glycol), and/or any suitable fluid which may be used to cool the torch. Suitable gases include inert gases such as nitrogen gas. Cooling material 112 in the form of solids may be in pellet form and may include dry ice or other suitable material.

The cooling material 112 is within a container 114 which has an aperture 116 for insertion/removal of the front end 28 of the torch 25. The container 114 may also include a closeable second aperture 118. A filter or screen 122 may be placed within the second aperture 120. A flush device 122 may be coupled to the container 114 at the second aperture 120. The flush device 122 includes a valve (not shown) for opening and closing the second aperture 120 and releasing the material from the container 114.

The torch cooler 110 may also include a cooling element 124, such as a Peltier Device. The cooling element 124 is used to cool the cooling material 112. Alternatively, if the material 112 is a fluid, the cooling element 124 may remove the fluid from the container 114, cool it, and pump it back to the container 114.

In still another aspect of the present invention, the fluid bath 12 includes a torch cleaner. The nozzle 30, 30A, of the welding torch 25 may be made of various materials, such as a ceramic, copper, brass, or chrome. A suitable cleaner for the nozzle 30, 30A is chosen. The cleaner in the fluid bath 12 acts to clean the nozzle 30, 30A from its end up until the point at which it is dipped into the fluid bath 12. This allows a visual indication of how far the nozzle 30, 30A is being dipped into the fluid bath 12. As a visual indication, a person does not need to enter the work area, and thus, requiring that work being performed by halted, to confirm that the nozzle 30, 30A is being dipped into the fluid bath 12.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An apparatus for providing a bath of a fluid to a welding system, comprising:
    a reservoir being accessible to atmosphere and being adapted to receive a welding torch of the welding system;
    a feed container coupled to the reservoir;
    means for providing a balance between the surface tension of the fluid within the reservoir and fluid within the feed container; and,
    a bleeder apparatus coupled to the reservoir and being adapted to catch any overflow from the reservoir to maintain fluid level within the reservoir.

2. An apparatus, as set forth in claim 1, wherein the bleeder apparatus includes an overflow container and a bleeder line, the bleeder line being coupled between the reservoir and the overflow container.

3. An apparatus for providing a bath of a fluid to a welding system, comprising:
    a reservoir being accessible to atmosphere and being adapted to contain the fluid and to receive a welding torch of the welding system;
    a feed container coupled to the reservoir;
    means for providing a balance between the surface tension of the fluid within the reservoir and fluid within the feed container; and,
    a cooling system coupled to the reservoir and being adapted to remove heat from the fluid.

4. An apparatus, as set forth in claim 3, wherein the cooling system includes a solid state cooling element.

5. An apparatus, as set forth in claim 4, wherein the solid stated cooling element is a Peltier Device.

6. An apparatus, as set forth in claim 4, wherein the solid state cooling element is a solid state thermoelectric module which acts as a heat pump.

7. An apparatus, as set forth in claim 4, wherein the solid state cooling element is internal to the reservoir.

8. An apparatus, as set forth in claim 4, wherein the solid state cooling element is external to the reservoir.

9. An apparatus, as set forth in claim 3, wherein the cooling system includes an element in contact with at least a portion of the reservoir.

10. An apparatus, as set forth in claim 9, wherein the element is wrapped around at least a portion of the reservoir.

11. An apparatus, as set forth in claim 9, wherein the element is cooled with a refrigerant.

12. An apparatus, as set forth in claim 11, wherein the refrigerant is one of freon or liquid nitrogen.

13. An apparatus, as set forth in claim 11, wherein the element includes one or more tubes through which the refrigerant flows.

14. An apparatus, as set forth in claim 3, wherein the bath of fluid includes a cleaner for providing a visual indication of how far the welding torch has been dipped into the bath.

15. An apparatus for providing a bath of a fluid to a welding system, comprising:
    a reservoir being accessible to atmosphere and being adapted to contain the fluid and to receive a welding torch of the welding system;
    a feed container coupled to the reservoir;
    means for providing a balance between the surface tension of the fluid within the reservoir and fluid within the feed container; and,
    a magnetic device disposed within the fluid in the reservoir, the magnetic device adapted to create a magnetic field to remove spatter from the welding torch.

16. An apparatus, as set forth in claim 15, wherein the magnetic device is a magnet.

17. An apparatus, as set forth in claim 15, wherein the magnetic device is an electromagnetic coil device disposed within the fluid in the reservoir when the torch is inserted into the fluid.

18. An apparatus, as set forth in claim 15, further comprising a removable basket adapted to be inserted into the bath and to catch spatter removed from the torch.

19. An apparatus, as set forth in claim 18, wherein the basket is composed of stainless steel.

20. An apparatus, as set forth in claim 19, wherein the basket includes a handle.

21. An apparatus, as set forth in claim 19, wherein the basket includes a lip adapted to rest along a top edge of the reservoir.

22. An apparatus, as set forth in claim 18, wherein the basket is rigid.

23. An apparatus, as set forth in claim 18, wherein the basket is collapsible.

24. An apparatus, as set forth in claim 17, wherein the electromagnetic coil device includes base and a coil wrapped about the base.

25. An apparatus, as set forth in claim 24, wherein the electromagnetic coil device is electrically coupled to a charging circuit.

26. An apparatus, as set forth in claim 24, wherein the base is connected to a support structure which supports the electromagnetic coil device such that the device is below a fill line of the reservoir.

27. An apparatus, as set forth in claim 26, wherein the support structure includes a plurality of arms which extend away from the base and are adapted to rest on top of the basket.

28. An apparatus, as set forth in claim 15, further comprising a brush located within the reservoir and being adapted to receive the torch when the torch is inserted into the reservoir and to remove spatter from the torch.

29. An apparatus, as set forth in claim 28, wherein the brush is composed of stainless steel.

30. An apparatus, as set forth in claim 28, wherein the brush includes a plurality of bristles arranged in a circular pattern.

31. An apparatus, as set forth in claim 28, wherein the brush includes a plurality of bristles arranged in a donut pattern.

32. An apparatus, as set forth in claim 28, wherein the brush is coupled to the reservoir.

33. An apparatus, as set forth in claim 15, wherein the bath of fluid includes a cleaner for providing a visual indication of how far the welding torch has been dipped into the bath.

34. An apparatus for providing a bath of a fluid to a welding system, comprising:
   a reservoir being accessible to atmosphere and being adapted to contain the fluid and to receive a welding torch of the welding system;
   a feed container coupled to the reservoir;
   means for providing a balance between the surface tension of the fluid within the reservoir and fluid within the feed container;
   a removable basket adapted to be inserted into the bath and to catch spatter removed from the torch; and,
   a brush located within the reservoir and being adapted to receive the torch when the torch is inserted into the reservoir and to remove spatter from the torch.

35. An apparatus, as set forth in claim 34, wherein the basket is composed of stainless steel.

36. An apparatus, as set forth in claim 34, wherein the basket includes a handle.

37. An apparatus, as set forth in claim 34, wherein the basket includes a lip adapted to rest along a top edge of the reservoir.

38. An apparatus, as set forth in claim 34, wherein the basket is rigid.

39. An apparatus, as set forth in claim 34, wherein the basket is collapsible.

40. An apparatus, as set forth in claim 34, wherein the brush is composed of stainless steel.

41. An apparatus, as set forth in claim 34, wherein the brush includes a plurality of bristles arranged in a circular pattern.

42. An apparatus, as set forth in claim 34, wherein the brush includes a plurality of bristles arranged in a donut pattern.

43. An apparatus, as set forth in claim 34, wherein the brush is coupled to the basket.

44. An apparatus, as set forth in claim 34, further comprising an electromagnetic coil device disposed within the fluid in the reservoir, the apparatus being adapted to energize the electromagnetic coil device when the torch is inserted into the fluid.

45. An apparatus, as set forth in claim 44, wherein the brush is coupled to the electromagnetic coil device.

46. An apparatus, as set forth in claim 34, wherein the bath of fluid includes a cleaner for providing a visual indication of how far the welding torch has been dipped into the bath.

47. An apparatus for cooling a welding torch, comprising:
   a container having an aperture for insertion and removal of the welding torch, the container including a closeable aperture; and,
   cooling material within the container for cooling at least a portion of the torch when the torch is dipped into the cooling material.

48. An apparatus, as set forth in claim 47, wherein the cooling material is in the form of a fluid.

49. An apparatus, as set forth in claim 47, wherein the cooling material is in the form of a solid.

50. An apparatus, as set forth in claim 47, wherein the cooling material is composed at least partially from oil.

51. An apparatus for cooling a welding torch, comprising:
   a container having an aperture for insertion and removal of the welding torch; and,
   cooling material within the container for cooling at least a portion of the torch when the torch is dipped into the cooling material, wherein the cooling material includes an inert gas.

52. An apparatus, as set forth in claim 47, including a device coupled to the container around the second aperture for flushing the material from the container.

53. An apparatus, as set forth in claim 47, including a screen disposed within the second aperture.

54. An apparatus for cooling a welding torch, comprising:
   a container having an aperture for insertion and removal of the welding torch; and,
   cooling material within the container for cooling at least a portion of the torch when the torch is dipped into the cooling material; and,
   a cooling element for cooling the material.

* * * * *